(12) United States Patent
Monin et al.

(10) Patent No.: US 9,044,889 B2
(45) Date of Patent: Jun. 2, 2015

(54) METHOD FOR PRODUCING VESSELS WITH FEEDBACK DEPENDING ON THE PRE-BLOWING STARTING POINT

(75) Inventors: Isabelle Monin, Octeville sur Mer (FR); Thierry Deau, Octeville sur Mer (FR)

(73) Assignee: SIDEL PARTICIPATIONS, Octeville sur Mer (FR)

(*) Notice: Subject to any disclaimer, the term of this patent is extended or adjusted under 35 U.S.C. 154(b) by 958 days.

(21) Appl. No.: 12/517,689

(22) PCT Filed: Dec. 4, 2007

(86) PCT No.: PCT/FR2007/001990
§ 371 (c)(1),
(2), (4) Date: Mar. 19, 2010

(87) PCT Pub. No.: WO2008/081107
PCT Pub. Date: Jul. 10, 2008

(65) Prior Publication Data
US 2010/0176528 A1  Jul. 15, 2010

(30) Foreign Application Priority Data

Dec. 5, 2006 (FR) ..................................... 06 10619

(51) Int. Cl.
*B29C 45/76* (2006.01)
*B29C 49/58* (2006.01)
(Continued)

(52) U.S. Cl.
CPC .................. *B29C 49/58* (2013.01); *B29C 49/06* (2013.01); *B29C 49/16* (2013.01); *B29C 49/783* (2013.01); *B29K 2067/00* (2013.01); *B29L 2031/7158* (2013.01); *B29C 49/4289* (2013.01)

(58) Field of Classification Search
USPC .............. 264/40.1, 454, 37.16, 37.25, 37.31, 264/37.14, 523, 50, 51, 40.3, 40.5, 40.7
See application file for complete search history.

(56) References Cited

U.S. PATENT DOCUMENTS

| 4,042,657 A | 8/1977 | Ostapchenko et al. |
| 5,244,610 A | 9/1993 | Kitzmiller |

(Continued)

FOREIGN PATENT DOCUMENTS

| DE | 101 16 665 A1 | 10/2002 |
| DE | 101 53 045 A1 | 5/2003 |

(Continued)

OTHER PUBLICATIONS

International Search Report for PCT/FR2008/001991, dated Jul. 15, 2008.

(Continued)

*Primary Examiner* — Stella Yi
(74) *Attorney, Agent, or Firm* — Sughrue Mion, PLLC

(57) ABSTRACT

Method for producing a vessel (2) by blowing in a mould (11) from a preform (3) made of plastic material, comprising the operations consisting in:
- introducing the preform (3) into the mould;
- at a predetermined moment, called pre-blowing cue ($t_P$), controlling the opening of an electrovalve (22) for establishing a communication between the inside of the preform (3) and a source (20) of gas at a predetermined pre-blowing pressure;
- measuring the pressure (P) inside the preform (3);
- detecting the so-called real moment ($t_A$), of the beginning of the pre-blowing, at which the (P) in the preform (3) starts to increase;
- comparing this moment ($t_A$) with a theoretical pre-blowing beginning moment;
- if the real moment ($t_A$) of the beginning of the pre-blowing follows the theoretical pre-blowing beginning moment, advance the pre-blowing cue ($t_P$);
- if the real moment ($t_A$) of the beginning of the pre-blowing precedes the theoretical pre-blowing beginning moment, delay the pre-blowing cue ($t_P$).

4 Claims, 13 Drawing Sheets

(51) Int. Cl.
  *B29C 49/78*   (2006.01)
  *B29C 49/06*   (2006.01)
  *B29C 49/16*   (2006.01)
  *B29K 67/00*   (2006.01)
  *B29L 31/00*   (2006.01)
  *B29C 49/42*   (2006.01)

(56) References Cited

U.S. PATENT DOCUMENTS

| | | | |
|---|---|---|---|
| 6,186,760 | B1 | 2/2001 | Latham |
| 2002/0076462 | A1* | 6/2002 | Boyd et al. .................. 425/143 |
| 2003/0209266 | A1 | 11/2003 | Dupuis |
| 2006/0012085 | A1 | 1/2006 | De Bruyn et al. |
| 2009/0102082 | A1* | 4/2009 | Gattolliat et al. ............ 264/40.3 |
| 2010/0204819 | A1 | 8/2010 | Monin et al. |

FOREIGN PATENT DOCUMENTS

| | | | |
|---|---|---|---|
| EP | 1 355 215 | A1 | 10/2003 |
| EP | 1 616 688 | A2 | 1/2006 |
| FR | 2 827 541 | A1 | 1/2003 |
| FR | 2 872 082 | A1 | 12/2005 |
| FR | WO2006054146 | * | 5/2006 |
| WO | 2004/045832 | A1 | 6/2004 |
| WO | 2005/097466 | A1 | 10/2005 |
| WO | 2006/008380 | A1 | 1/2006 |

OTHER PUBLICATIONS

United States Office Action mailed Nov. 14, 2012 for related U.S. Appl. No. 12/517,667.
United States Office Action mailed Sep. 28, 2012 for related U.S. Appl. No. 12/517,668.

* cited by examiner

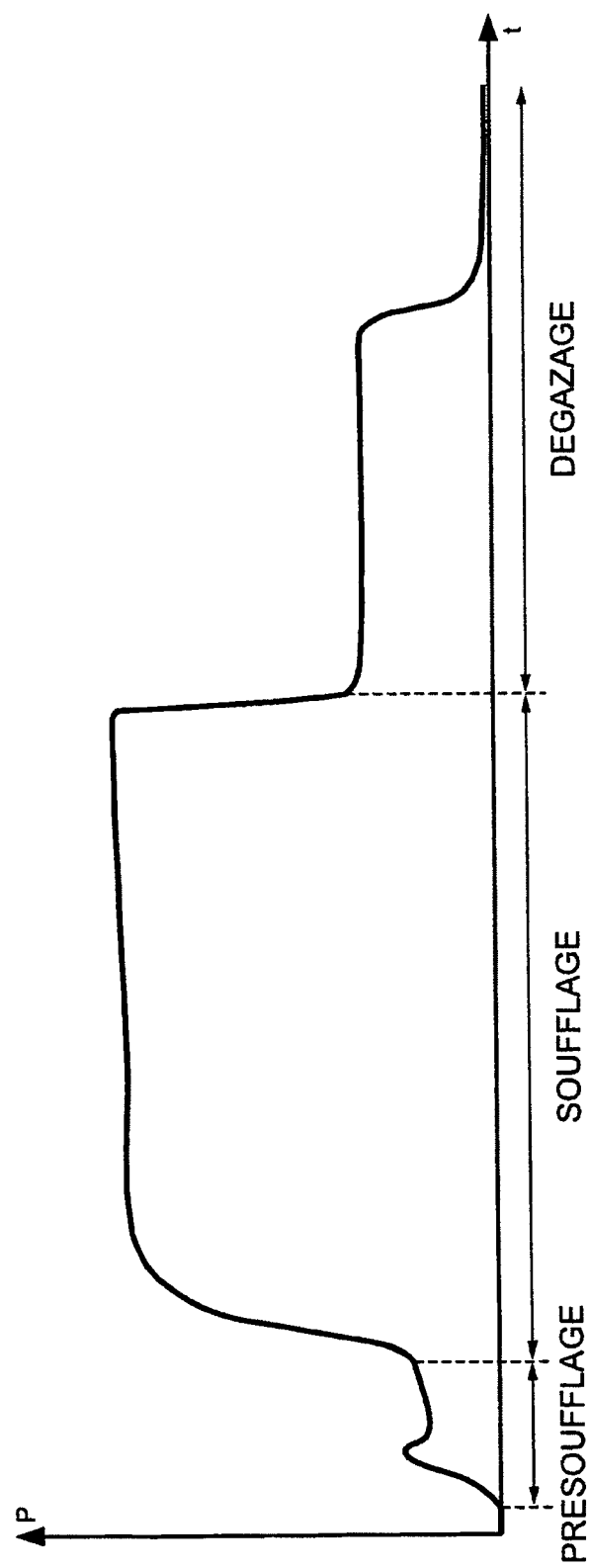

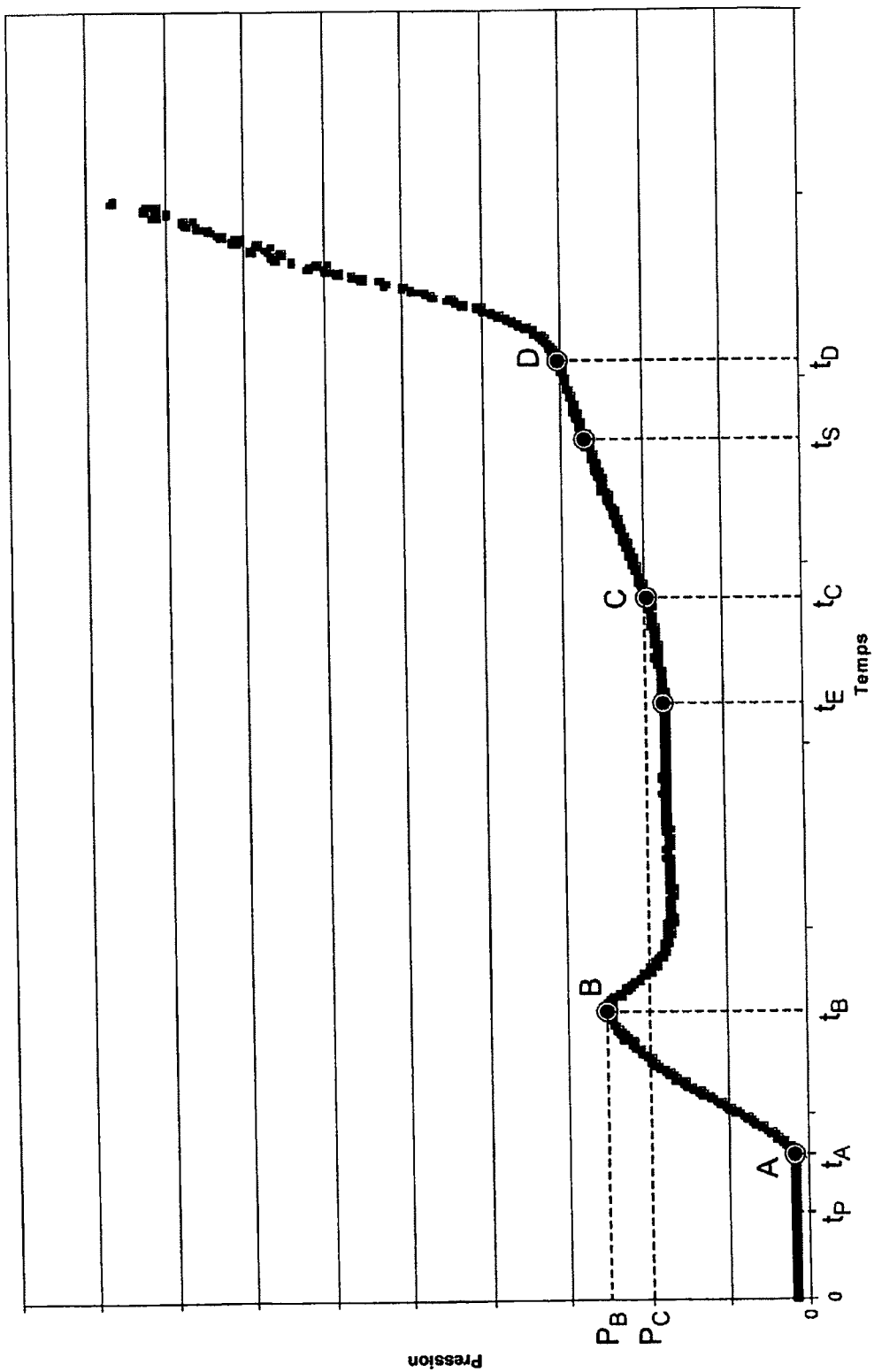

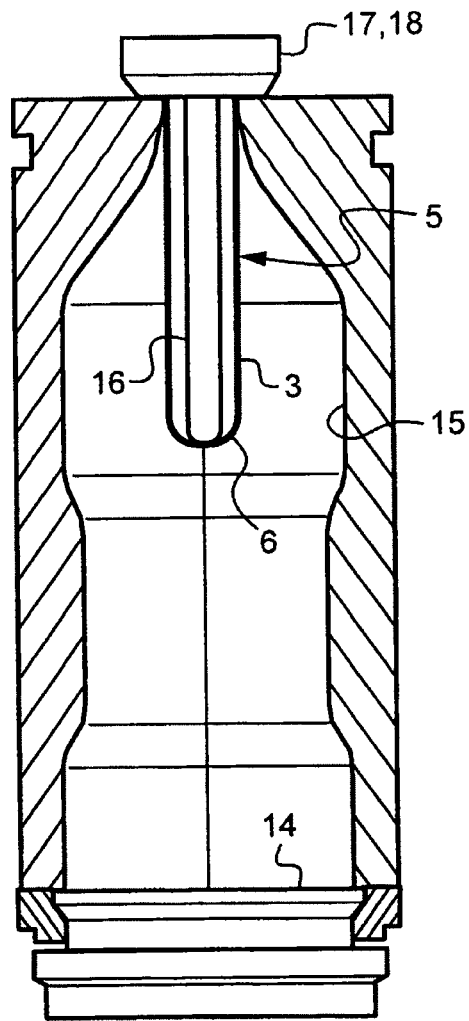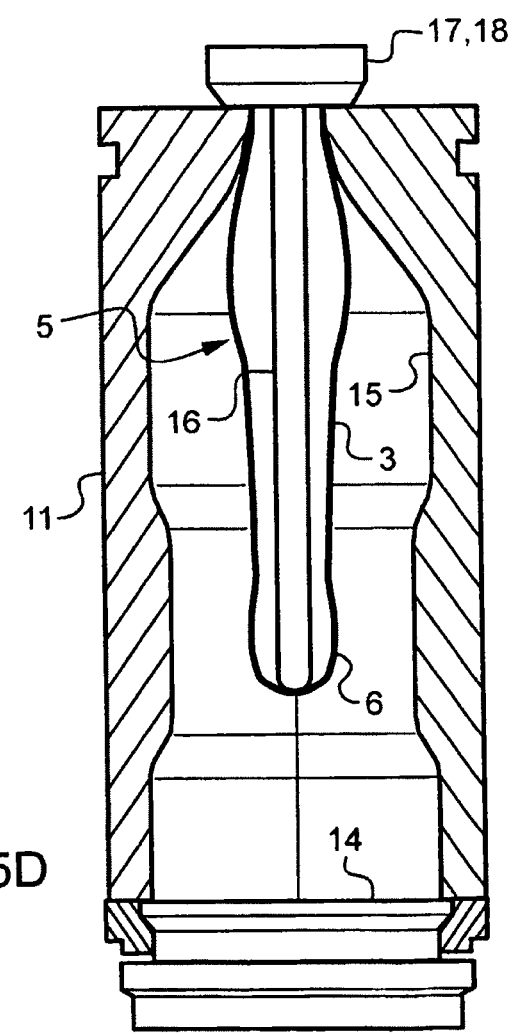
Fig.5C
Fig.5D

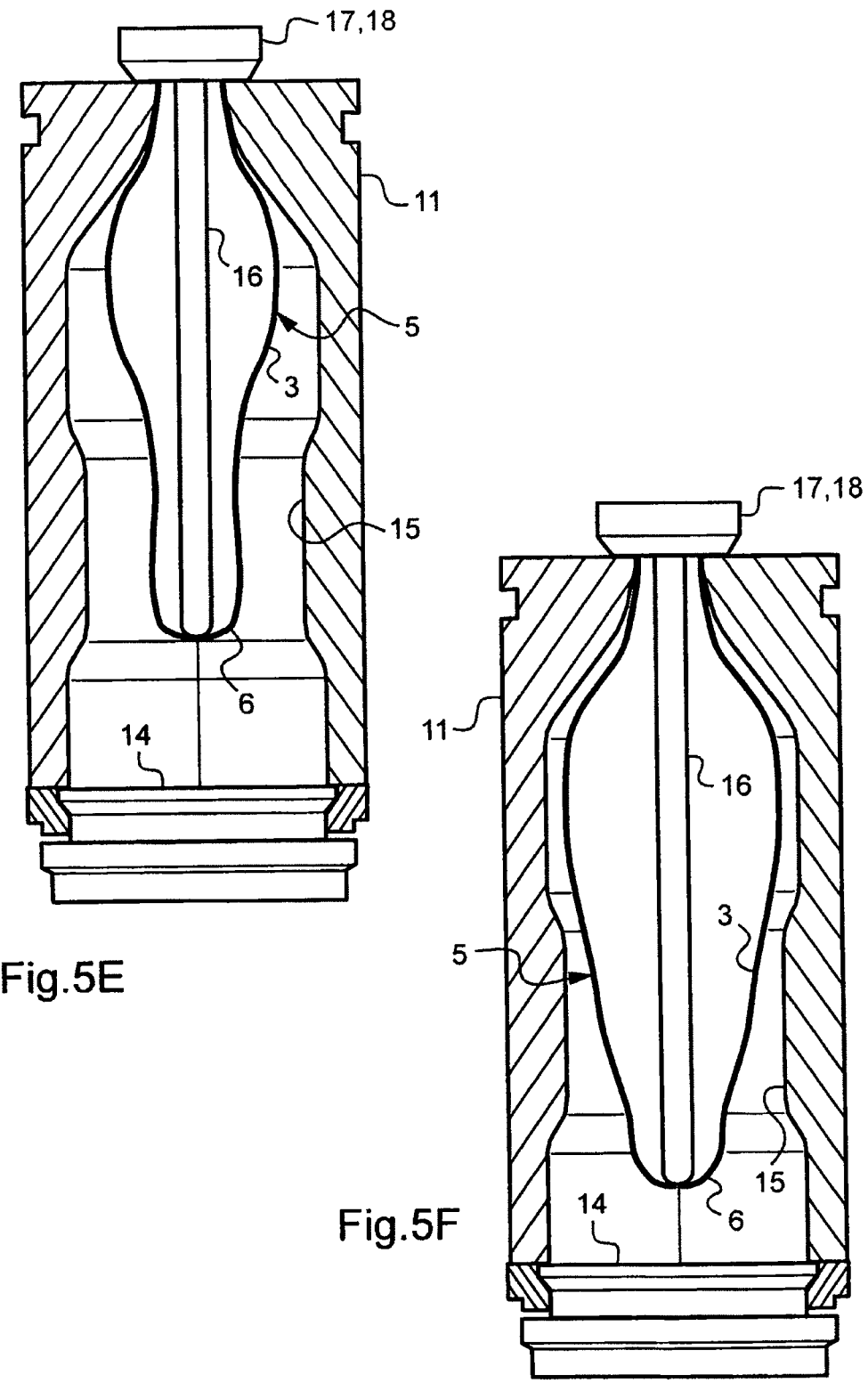

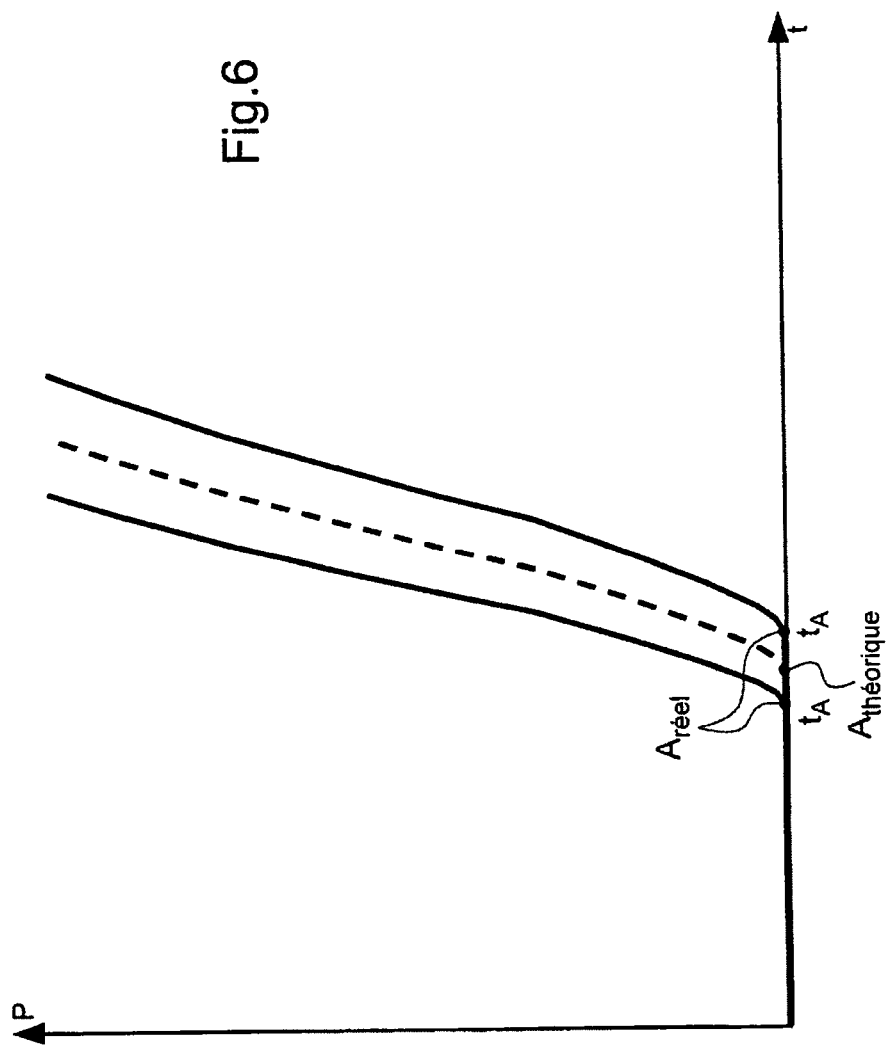

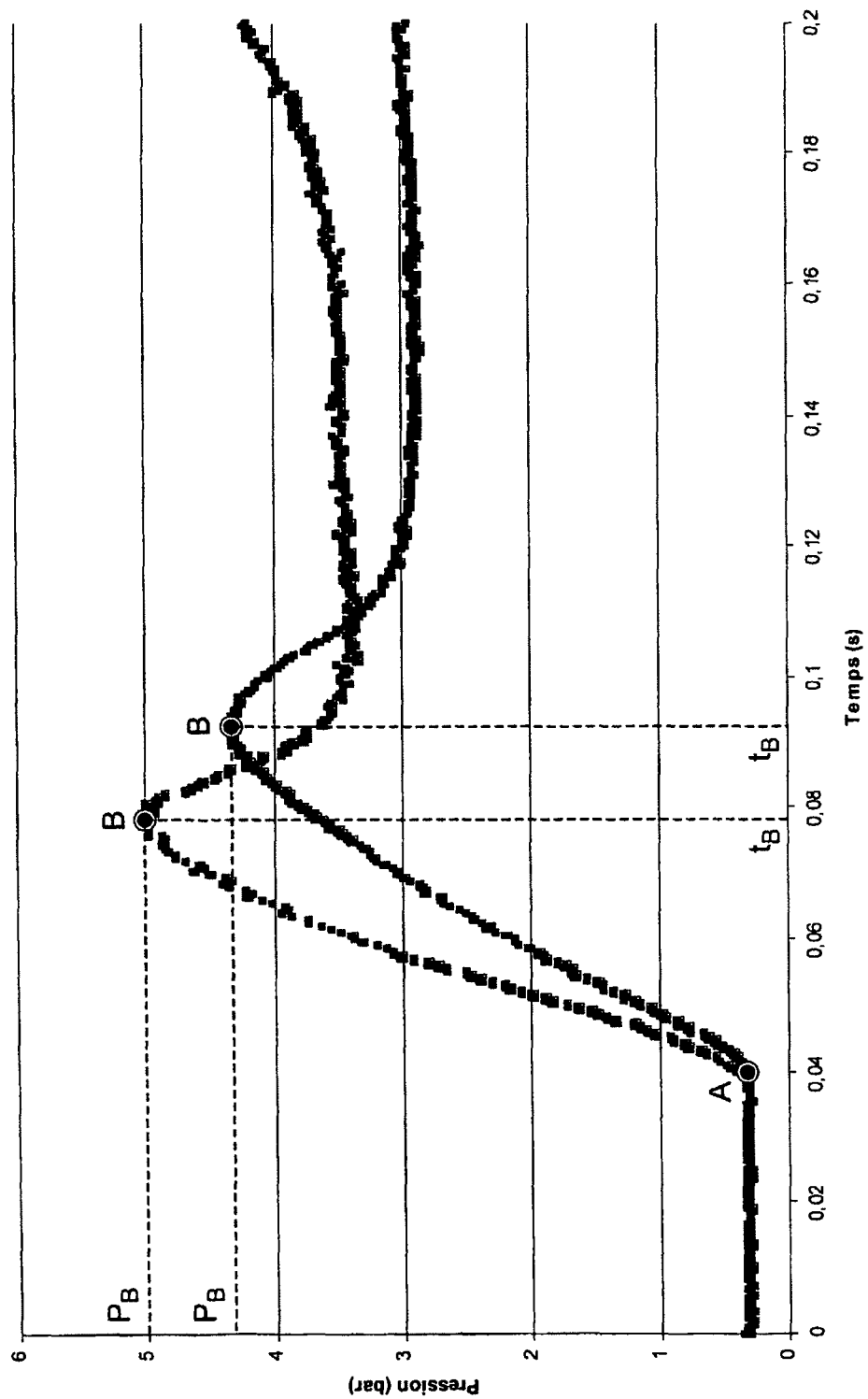

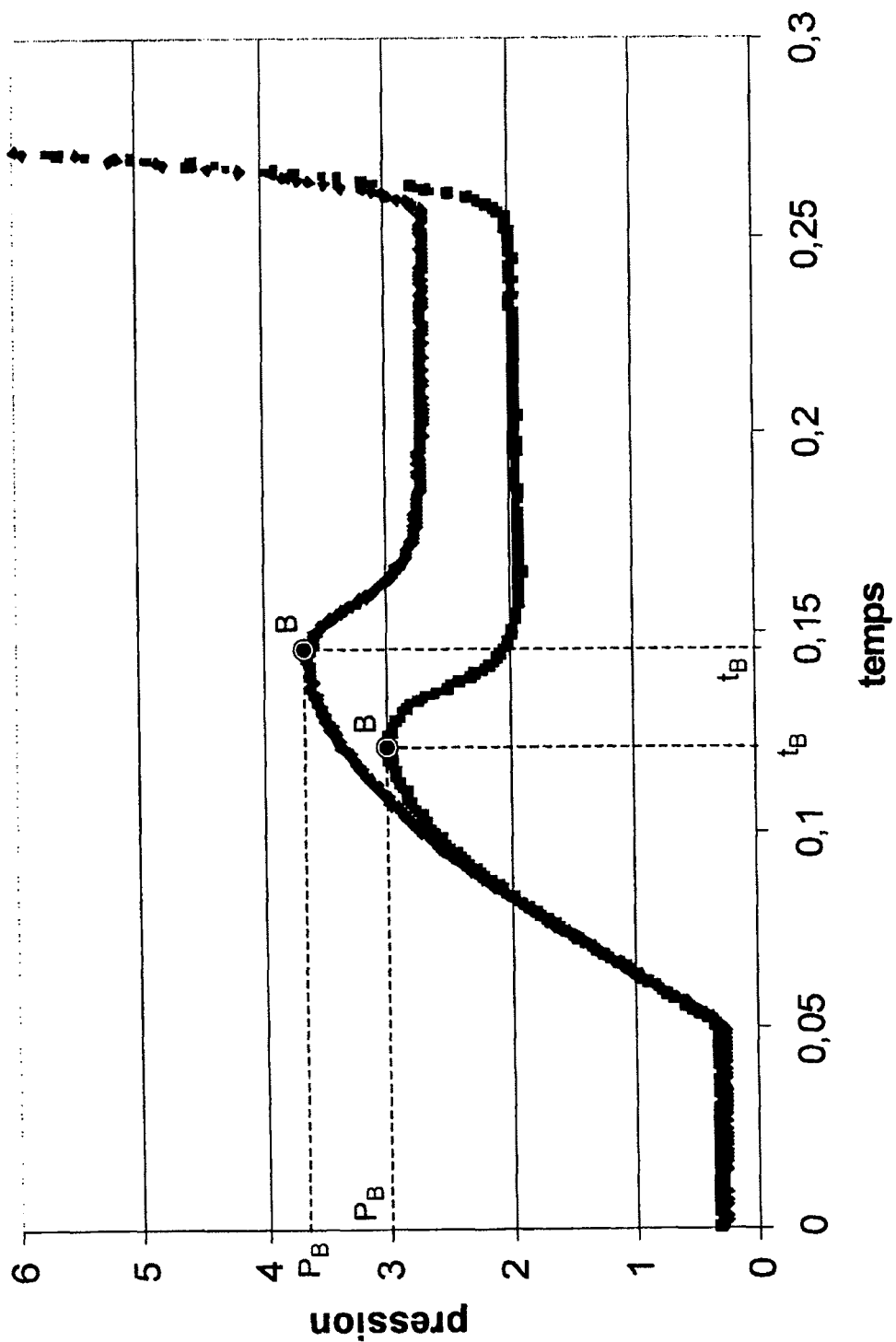

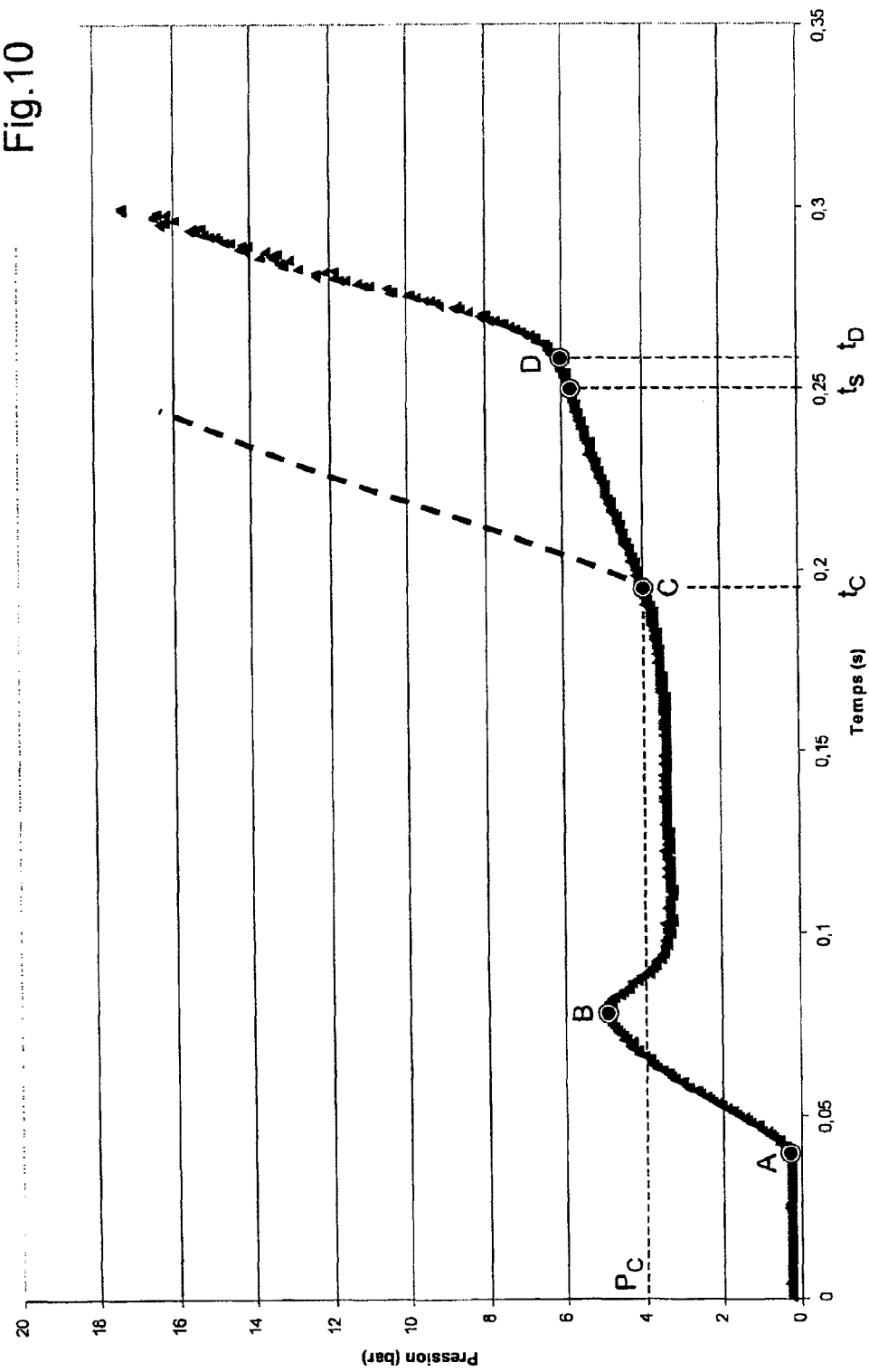

METHOD FOR PRODUCING VESSELS WITH FEEDBACK DEPENDING ON THE PRE-BLOWING STARTING POINT

CROSS REFERENCE TO RELATED APPLICATIONS

This application is a National Stage of International Application No. PCT/FR2007/001990 filed Dec. 4, 2007, claiming priority based French Patent Application No. 0610619, filed Dec. 5, 2006, the contents of all of which are incorporated herein by reference in their entirety.

The invention relates to producing vessels by blow-moulding or stretch blow-moulding, from preforms made of plastic material.

In order to manufacture a vessel according to the blowing technique, we begin by heating a preform (whether entailing a preform or an intermediary vessel that has undergone a first blowing operation from a preform) at a temperature greater than the glass transition temperature of the material of the preform. The preform is then introduced into a mould, then the blowing of the preform is carried out by injecting therein a gas (such as air) under high pressure (generally greater than 30 bars). The stretch blow-moulding technique consists, other than the blowing, in stretching the preform using a sliding rod, in order in particular to minimise the offset of the vessel and to render uniform as much as possible the distribution of the material.

In order to prevent the preform from bursting during the blowing operation, prior to the blowing, a pre-blowing operation is generally provided, during which a gas under reduced pressure (generally between 5 and 16 bars) is injected into the preform. It is during the pre-blowing operation that is carried out the stretching of the preform, with the blowing intervening only afterwards.

In a context of industrial production, where manufacturing rates reach several tens of thousands of vessels per hour and per machine (a machine generally comprises several moulds mounted on a rotating carrousel), the duration of the method for producing a vessel, between the moment the preform is introduced into the mould and the moment the formed vessel is ejected, is of a few seconds. The duration of the pre-blowing is only of a few tenths of a second.

The constant desire of industrialists to reduce the quantity of material used for each vessel, combined with the velocity of the method, makes the manufacture delicate and can lead to substantial scrap rates. Among the main defects observed on the vessels is a poor distribution of the material. The difficulty that exists in combining saving material and the increase in the rates has led the industrialists to become more interested in the unfolding of the method by monitoring the variations in certain parameters over time, the main one being the pressure inside the preform, combined with the stretching speed.

Certain entities, such as Du Pont De Nemours in its American U.S. Pat. No. 4,042,657, suggest that there is a correlation between the pressure variations in the preform and the final form of the vessel, and recommend rejecting the vessels of which the pressure curve does not comply with a standard curve. If the proposal to reject the non-compliant vessels makes it possible to improve the overall quality of production, it puts a strain however on productivity and, in the hypothesis where the rejected vessels would not be recycled, leads to a wasting of material although it is desired to save it.

The invention in particular aims to overcome these disadvantages, by proposing a method making it possible to improve the quality of the vessels produced, while still limiting scrapping, and by maintaining—and even by increasing—the production rates.

To this effect, the invention proposes, according to a first object, a method for producing a vessel by blowing in a mould from a preform made of plastic material, comprising the following steps:
  introducing the preform into the mould;
  at a predetermined moment, called pre-blowing cue, controlling the opening of an electrovalve for establishing a communication between the inside of the preform and a source of gas at a predetermined pre-blowing pressure;
  measuring the pressure inside the preform;
  detecting the so-called real moment of the beginning of the pre-blowing at which the pressure in the preform starts to increase;
  comparing this moment with a theoretical pre-blowing beginning moment;
  if the real moment of the beginning of the pre-blowing follows the theoretical pre-blowing beginning moment, advance the pre-blowing cue;
  if the real moment of the beginning of the pre-blowing precedes the theoretical pre-blowing beginning moment, delay the pre-blowing cue.

It has been observed that not only the vessels as such produced have, in relation to the vessels obtained by the conventional methods, a quality that on the average is higher thanks to a better distribution of the material, but also that this quality is more constant over time.

Additional operations can be considered consisting in:
  measuring the difference between the real moment and the theoretical pre-blowing beginning moment;
  if the real moment of the beginning of the pre-blowing follows the theoretical pre-blowing beginning moment, advance the pre-blowing cue by a value equal to this difference;
  if the real moment of the beginning of the pre-blowing precedes the theoretical pre-blowing beginning moment, delay the pre-blowing cue by a value equal to this difference.

Alternatively, the following operations can be provided, consisting in:
  measuring the difference between the real moment of the beginning of the pre-blowing and the pre-blowing cue;
  if the real moment of the beginning of the pre-blowing follows the pre-blowing cue increased by a predetermined response time of the electrovalve, advance the pre-blowing cue by a value equal to the difference between the real moment of the beginning of the pre-blowing and the pre-blowing cue, increased by the response time of the electrovalve;
  if the real moment of the beginning of the pre-blowing precedes the pre-blowing cue reduced by a predetermined response time of the electrovalve, delay the pre-blowing cue by a value equal to the difference between the real moment of the beginning of the pre-blowing and the pre-blowing cue, reduced by the response time of the electrovalve.

The invention proposes, according to a second object, a machine for manufacturing vessels from preforms made of a plastic material, comprising:
  a mould having a cavity intended to receive a preform;
  a source of gas at a predetermined pre-blowing pressure;
  an electrovalve able to establish a communication between the inside of the preform, received in the cavity, and said source of gas;

means for controlling the opening and the closing of the electrovalve;

a sensor able to measure the pressure inside the preform;

means for detecting a so-called real moment of the beginning of the pre-blowing at which the pressure in the preform starts to increase;

means for comparing this moment with a theoretical pre-blowing beginning moment;

means for adjusting the opening moment of the electrovalve according to the result of this comparison.

According to an embodiment, the machine comprises means for memorising a plurality of real pre-blowing beginning moments detected on a series of manufactured vessels.

According to a third object, the invention proposes a computer programme product intended to be implemented on a machine for manufacturing vessels such as described hereinabove, comprising instructions for:

controlling the opening and the closing of the electrovalve;

taking into account the real moment of the beginning of the pre-blowing;

taking into account the theoretical pre-blowing beginning moment;

comparing the real moment of the beginning of the pre-blowing with the theoretical pre-blowing beginning moment;

adjusting the opening moment of the electrovalve according to the result of this comparison.

Other objects and advantages of the invention shall appear when reading the description provided hereinafter in reference to the annexed drawings wherein:

FIG. 3 is a diagram whereon is plotted a curve showing the variations in the pressure inside a preform during the manufacture of a vessel;

FIG. 4 is a diagram whereon is plotted a curve showing the variations in the pressure inside a preform during the pre-blowing operation;

FIGS. 5A to 5H are cross-section view showing the preform in the mould, at different stages during the pre-blowing;

FIG. 6 is a diagram showing the superposition of two pressure curves corresponding respectively to two different moments of controlling the opening of a pre-blowing electrovalve;

FIG. 7 is a diagram showing the superposition of two pressure curves corresponding respectively to two distinct values of the pressure or of the pre-blowing flow rate;

FIG. 9 is a diagram showing the superposition of two pressure curves corresponding respectively to two distinct values of the heating temperature of the preform; and FIG. 10 is a diagram showing the superposition of two pressure curves corresponding respectively to two moments of controlling the opening of a blowing electrovalve.

Figure 1:
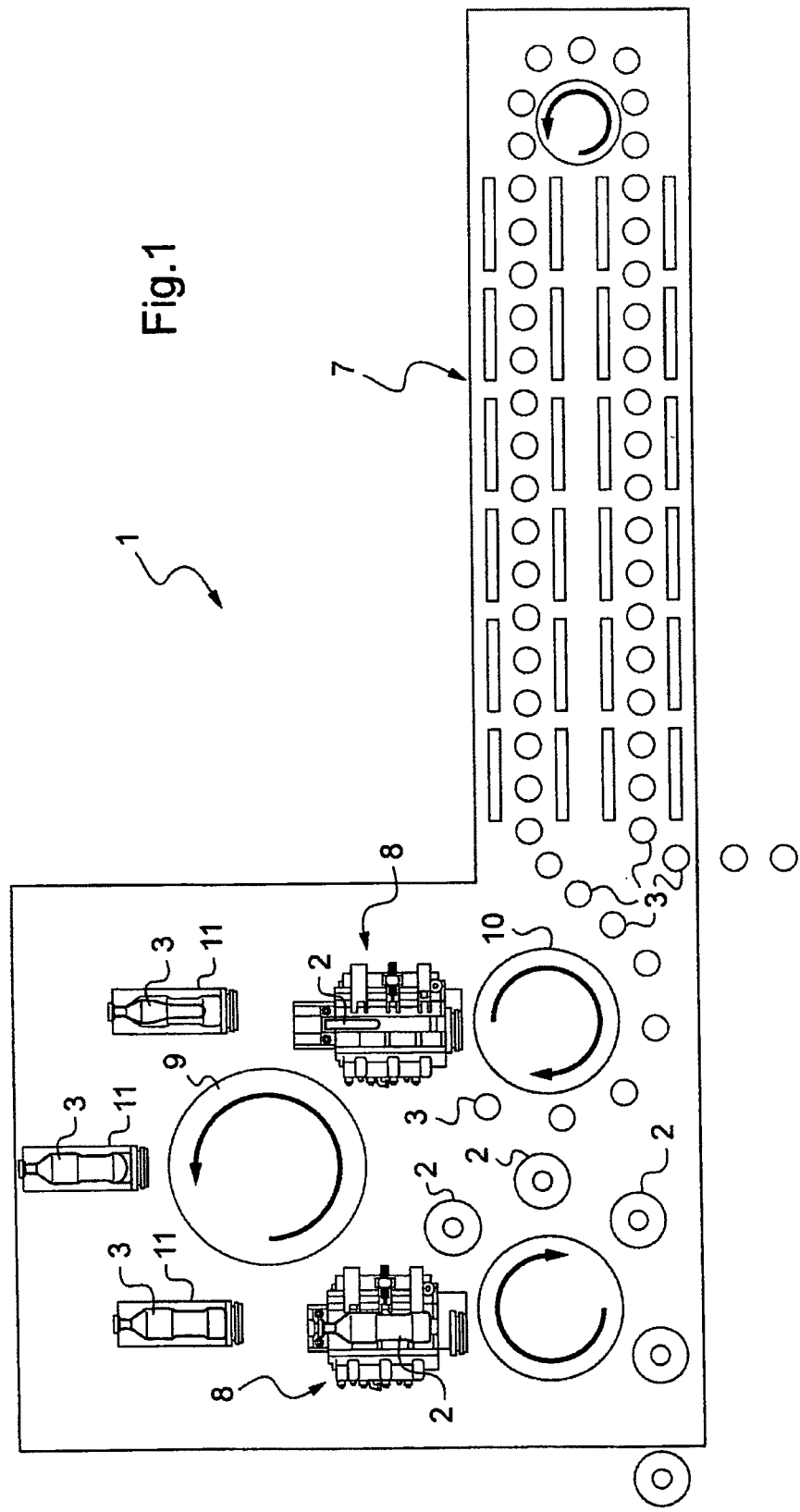
FIG. 1 is a schematic view showing a machine for manufacturing vessels.

FIG. 1 shows a machine 1 for the manufacturing of vessels 2 from preforms 3 made of plastic material such as PET (polyethylene terephtalate). According to a preferred embodiment, the preforms 3 are preforms from which the final vessels 2 are directly obtained, without passing by an intermediary vessel. Each preform 3 comprises a neck 4 (which does not undergo any deformation during the formation of the vessel 2), and a cylindrical body 5 terminated by a hemispheric base 6.

This machine 1 comprises an oven 7 of the tunnel type, wherein the preforms 3 are continuously heated to a temperature greater than the glass transition temperature of their material. In the case of PET, of which the glass transition temperature is in the neighbourhood of 80° C., the heating temperature is more preferably between 100° C. and 140° C.

The machine 1 further comprises a plurality of moulding units 8 mounted on a rotating carrousel 9 arranged at the outlet of the oven 7 with interposition of a transfer wheel 10 providing the synchronisation of the heating and moulding operations of the preforms 3.

Each moulding unit 8 comprises a mould 11, made of steel or aluminium alloy, comprising two half-moulds 12, 13 and a mould base 14 which together define an internal cavity 15, intended to receive a preform 3 coming from the oven 7.

Each moulding unit 8 further comprises:

a stretch rod 16 mounted sliding in relation to mould 11 along a main X axis (generally of revolution) of the latter, between a high position (FIG. 2) making it possible to introduce the preform 3 and a low position (FIG. 5H) where, at the end of the stretching of the preform 3, the rod 16 reaches the mould base 14 pushing therein the base 6 of the latter, a case 17 defining a nozzle 18 wherein slides the rod 16 and which, during the manufacture of the vessel 2, interacts with the neck 4 of the preform 3.

The moulding unit 8 further comprises several fluid circuits exiting into the nozzle 18 via the case 17, i.e.:

a medium pressure pre-blowing air circuit 19 (between 5 and 16 bars), this circuit 19 comprising a source 20 of pre-blowing air and a duct 21 (which can be formed at least partially in the case 17) connecting this source 20 to the nozzle 18 with interposition of a first so-called pre-blowing electrovalve 22, a high pressure blowing air circuit 23 (between 30 and 40 bars), comprising a source 24 of blowing air and a duct 25 (which can be formed at least partially in the case 17) connecting this source 24 to the nozzle 18 with interposition of a second so-called blowing electrovalve 26, a degassing circuit 27 comprising an outlet for venting 28 and a duct 29 connecting the nozzle 18 to this outlet 28 with interposition of a third so-called degassing electrovalve 30

The electrovalves 22, 26, 30 are connected electrically to a control unit 31 which controls the opening and the closing of it (duly taking their response times into account). These electrovalves 22, 26, 30 can be arranged at a distance from the case 17; however, for more compactness, they are more preferably at least partially included in the latter, in accordance with the embodiment described in the French patent application published under number FR 2 872 082 or in the equivalent international application published under the number WO 2006/008380, both in the name of the applicant and to which those skilled in the art may refer.

The moulding unit 8 is moreover provided with a pressure sensor 32 with which is measured the pressure inside the preform 3 during the manufacture of the vessel 2. To this effect, the sensor 32, connected to the control unit 31 that memorises the pressure measurements taken, is provided with a substantial portion 33 exiting into the nozzle 18 (where the pressure is identical to that inside the preform 3).

The manufacture of a vessel 2 from a preform 3 is carried out as follows.

The preform 3, mounted on a conveyor, is first of all introduced in the oven 7 where it is heated, neck 4 downwards, in the conditions described hereinabove. At the outlet of the oven 7, the preform 3 is grasped by a clamp of the transfer wheel 10 and introduced, after having been turned over to have the neck 4 directed upwards, into a mould 11 opened beforehand. In this position, the stretch rod 16 is in high position.

Figure 5A:
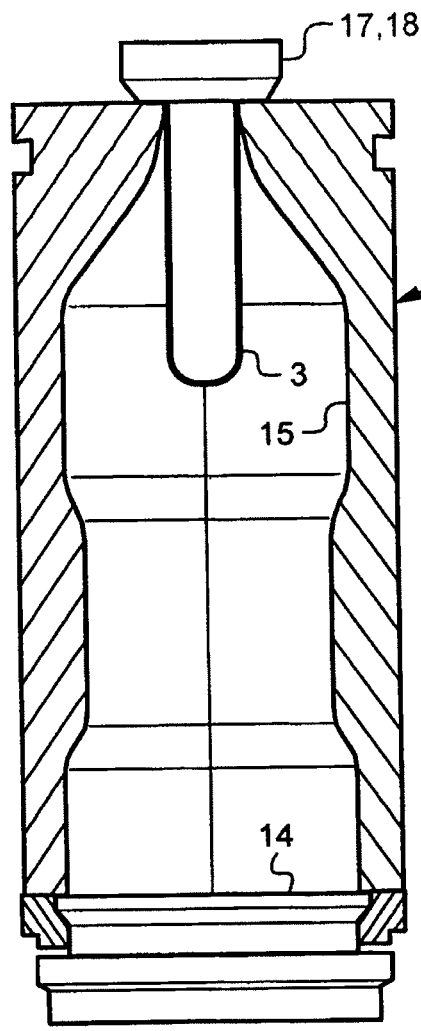
Figure 5B:
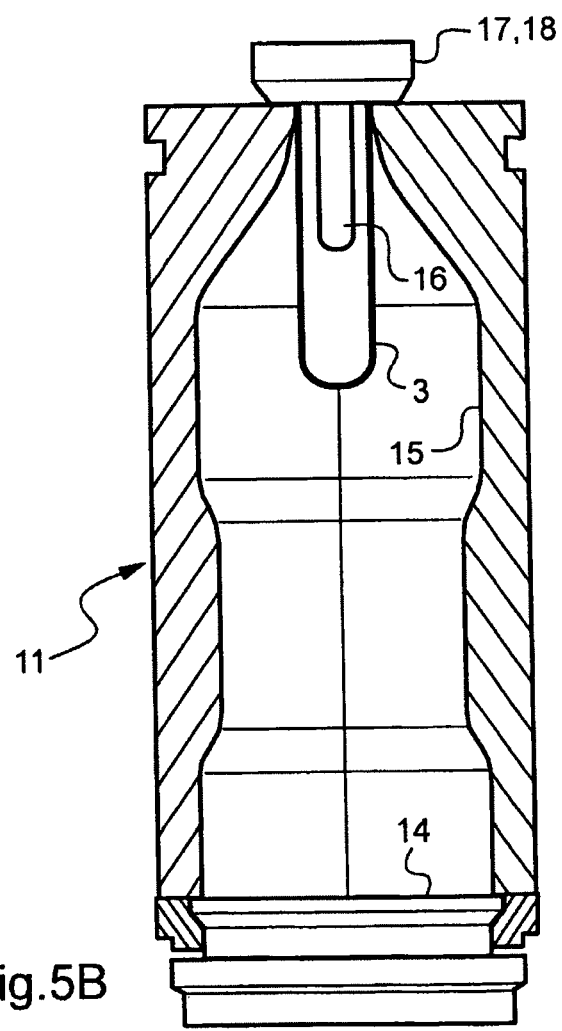

As the carrousel 9 rotates, the mould 11 closes on the preform 3. Once the mould 11 is closed (FIG. 5A), begins, at a predetermined moment called starting cue, the descending of the stretch rod 16 into the moulding cavity 15 (FIG. 5B). The starting cue constitutes the origin of the axis of time (abscissas) in FIGS. 3, 4 and 6 to 10. Starting from this moment the pressure P inside the preform is measured continuously, each value being memorised in the control unit 31. The term "continuously" means that the period during which the pressure measurements are taken is low in light of the time needed for the pressure variations in the preform 3. To this effect, a high-performance sensor 32 will be chosen, making it possible to take pressure measurements at a period of less than or equal to 5 ms (millisecond), more preferably less than or equal to 2 ms, with the ideal being to be able to take the measurements at a period of 1 ms.

To starting cue corresponds a predefined angular position of the mould 11 on the circumference of the carrousel 9. According to a first embodiment, the controlling of the displacement of the stretch rod 16 is purely mechanical, carried out using a cam against which rolls or slides a cam follower integral with the stretch rod 16. In this case, the moment when the stretch rod 16 begins its descent is confounded with the starting cue, which corresponds to the moment when the cam follower enters into contact with the cam.

According to a second embodiment, the displacement of the stretch rod 16 is provided by an electromechanical system controlled by the control unit 31. In this case, the moment when the descent of the stretch rod 16 begins is shifted in relation to starting cue by an offset value equal to the response time of the electromechanical system. This offset value, provided by the manufacturer of the system, is taken into account in the adjustment of the starting cue so that the descent of the stretch rod 16 starts as soon as possible after the closing of the mould 11. $V_E$ denotes the displacement speed of the stretch rod 16; this speed is also called stretching speed.

At a predetermined moment, called pre-blowing cue $t_P$, the control unit 31 controls the opening of the pre-blowing electrovalve 22 for establishing a communication between the inside of the preform 3 and the source 20 of pre-blowing air.

The moment, called real moment of the beginning of the pre-blowing and noted as $t_A$, from which the pressure P in the preform 3 begins to increase, registers a delay in relation to the pre-blowing cue $t_P$, equal to the response time of the pre-blowing electrovalve 22.

This delay, either provided by the manufacturer of the electrovalve 22, or measured, is taken into account in the adjustment of the pre-blowing cue $t_P$, so that the real moment $t_A$ of the beginning of pre-blowing begins after the moment when the stretch rod 16 reaches the base of the preform 3, with this moment able to be calculated simply from the descending speed (known) of the stretch rod 16 and from the length (also known) of the preform 3.

In FIGS. 4 and 6, the point of the curve having for abscissa the real moment $t_A$ of the beginning of the pre-blowing is noted as A. To this point corresponds a pressure (relative) substantially nil, the pressure inside the preform 3 during its introduction into the mould 11 being indeed substantially equal to the atmospheric pressure.

From point A begins an axial expansion phase of the preform 3. As can be seen in FIGS. 4 and 6, the slope of the pressure curve at point A is nil on the left, and positive on the right. From point A, the pressure in the preform 3 increase as it is stretched, the flow of air introduced in the preform 3 being higher than the increasing of the internal volume of the preform 3 (which undergoes no radial expansion, Cf. FIG. 5C), up to a moment, called development moment and noted as $t_B$, when the plastic flow threshold of the preform 3 has been reached. At this moment $t_B$ a pressure peak occurs, the corresponding point, called development point, being noted as B in FIGS. 4 and 7 to 9. At point B the slope of the blowing curve is nil, this slope reversing from left (where it is positive) to right (where it is negative) of point B. The corresponding pressure, called development pressure, is noted as $P_B$.

Starting from the development moment $t_B$ begins an axial and radial expansion phase of the preform. At the beginning of this phase, immediately after the development point, a momentary drop $\Delta P$ in the pressure P is noted inside the preform (FIG. 5D). This drop $\Delta P$ in pressure is due to the sudden beginning of the radial expansion of the preform 3, which, with its plastic flow threshold crossed, thus undergoes a plastic deformation.

Figures 5G, 5H:
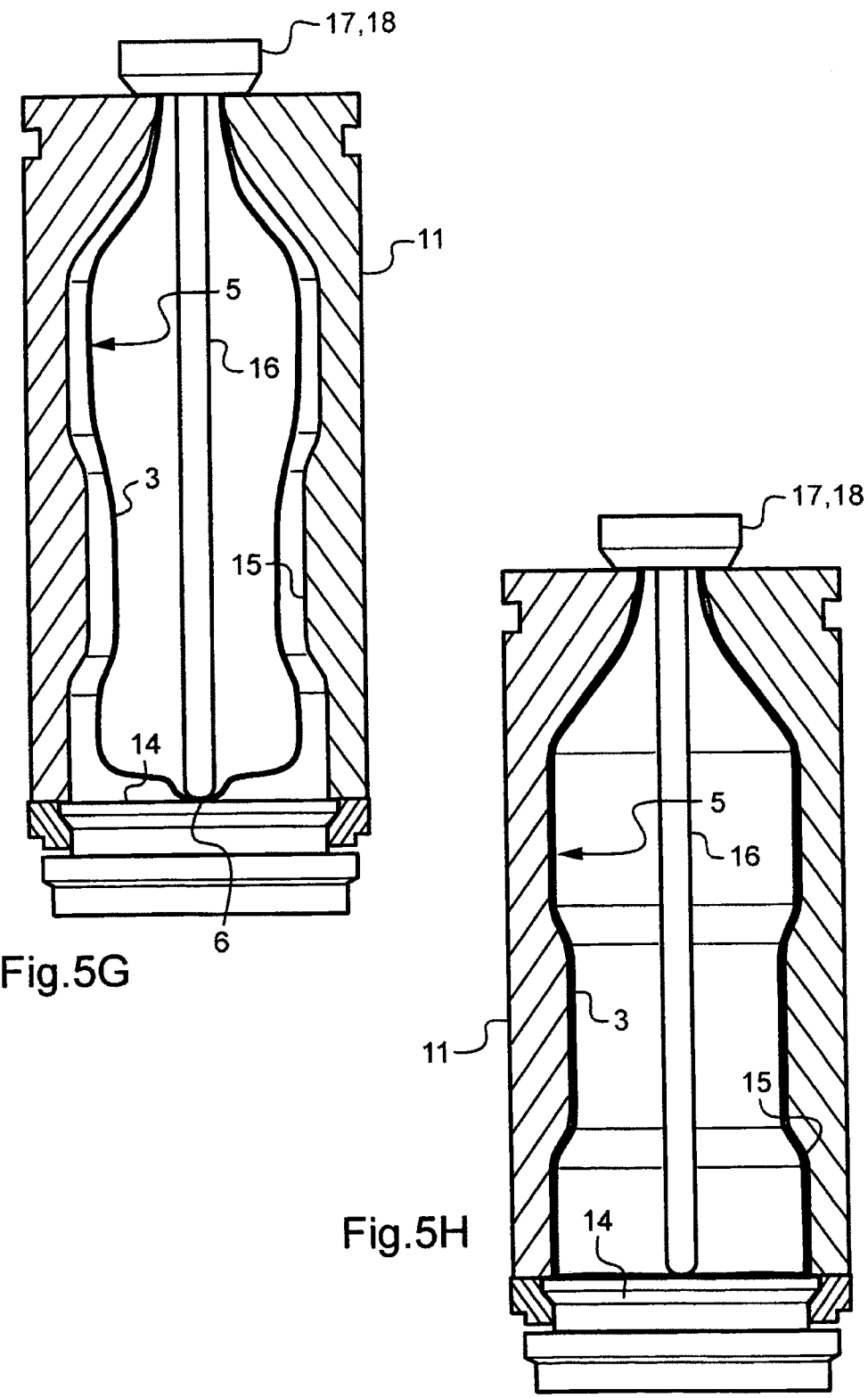

After having dropped by a value $\Delta P$ of approximately 1 bar, the pressure P is maintained, with the increase in the volume of the preform 3 offsetting the flow of air injected in the latter (FIGS. 5E, 5F). This radial and axial expansion phase ends when the stretching ends, the stretch rod 16 having reached its low position where it pushes the base 6 of the preform 3 against the mould base 14 (FIG. 5G).

The combination of a radial deformation and of an axial deformation of the preform 3 leads to a bi-orientation (axial and radial) of the macromolecules of the material, which in particular results in increasing the mechanical strength of the vessel 2 and in decreasing its permeability to gases and liquids. For further information, refer to the work of Rosato and DiMattia, "Blow Molding Handbook" ($2^{nd}$ edition, Hanser, 2004).

After the end of the stretching, the rod 16 being maintained in its low position, takes place a radial expansion phase of the preform 3 during which no inflection of the pressure P is noted, which continues to be stable. That is why at the moment, noted as $t_E$, when the stretching ends, no significant point corresponds on the pressure curve, this moment $t_E$ being however known as it is predetermined by the value (which may be adjustable) of the stretching speed $V_E$ and the height of the vessel 2. This radial expansion phase ends at a moment, called moment of expansion end, noted as $t_C$, when the preform 3 has reached the surface of the cavity 15 over substantially all of its height, in other words when the internal volume of the preform 3 is almost equal to the final volume of the vessel 2, if localised zones are accepted where the contact between the preform 3 and the cavity 15 is not complete, for example in zones wherein are arranged ribs, grooves or other recesses aiming to confer upon the vessel 2 better strength or a certain aesthetics (FIG. 5H). To the moment $t_C$ of expansion end corresponds on the pressure curve a significant point, called expansion end point and noted as C in FIGS. 4 and 10, where the curve sags and has an increase in its slope. The pressure at the point C, called expansion end pressure, is noted as $P_C$.

From the expansion end point C begins a growth phase in the pressure P in the preform 3, at a constant volume. The rate, noted as $D_P$ and the pressure, noted as $P_P$, of pre-blowing air being maintained constant, the pressure P in the preform 3 increases in a linear manner up to a moment, noted as $t_D$, of the beginning of blowing from which starts a blowing phase: communication of the inside of the preform 3 is established with the source 24 of blowing air, the pressure P in the preform 3 increasing suddenly up to the value of the blowing pressure. In light of the response time of the blowing electrovalve 26, the moment $t_D$ of the beginning of blowing registers a slight delay in relation to a so-called blowing cue and noted as $t_S$, to which the control unit 31 controls simultaneously the closing of the pre-blowing electrovalve 22 and the opening of the blowing electrovalve 26. To the moment $t_D$ of beginning of blowing corresponds on the pressure curve a significant point, called blowing starting point and noted as D, when the curve sags and has a substantial increase in its slope.

The inventors feel that the pre-blowing is a determining factor in the quality of the final vessel. Controlling pre-blowing is carried out by the intermediary of the plot of the corresponding pressure curve. Ideally, all the vessels are identical. In reality, the repeatability of the method for producing is not provided due to variations in physical parameters (pressure, temperature) and mechanical parameters (electrovalve response time, obstruction of the pneumatic circuits, leaks in the pre-blowing and blowing circuits, etc.) which can have an impact on the different moulding units 8 of the machine 1 during the production of vessels 2. That is why substantial differences are noted between the vessels 2. In order to provide the constancy of the quality of the vessels obtained, in order to place them in conformity as much as is possible with a pre-established standard, the inventors propose to provide a continuous adjustment of the pre-blowing operations through feedback on at least one of the following parameters:

heating temperature T of the preforms;
pre-blowing pressure $P_P$;
pre-blowing rate $D_P$;
stretching speed $V_E$;
pre-blowing cue $t_P$;
blowing cue $t_S$.

Through hypothesis, we have a theoretical pre-blowing curve, (i.e. the portion of the pressure curve between the starting cue, taken as the origin of time, and the point D) for which the quality of the vessel obtained appears to be compliant with pre-established criteria including for example the mass of the base of the vessel, assumed to lie within a range of values, the uniformity of the thickness of the wall, the coaxiality of the base and of the neck, etc.

The inventors have considered that it is illusory to attempt to obtain for each vessel produces a curve that is strictly identical to the theoretical pre-blowing curve and consequently propose a simpler method for controlling while still remaining effective. According to this method, at least one characteristic point is selected on the theoretical curve, defined by a time/pressure ordered pair, deemed characteristic of the proper unfolding of the pre-blowing operations, and a tolerance zone is defined around this point, the combination of a time tolerance (along the x axis) and of a pressure tolerance (along the y axis), in order to take into account in particular the error margins on the measurements taken.

For the or each characteristic point, the real point, such as results from the measurements taken during the production, is compared with the corresponding theoretical characteristic point. In practice, it is verified that the real point, such as is measured, is located within the tolerance zone defined around the theoretical characteristic point by checking that the moment of the real point is located in the time tolerance and that its pressure is located within the pressure tolerance. In the hypothesis where the real point is effectively located in the tolerance zone, the real and theoretical points are declared confounded. On the contrary, when the real point is located outside of the tolerance zone, the real and theoretical points are declared distinct, in which case, as we shall see hereinafter, feedback measurements can be taken in order to modify at least one of the parameters listed hereinabove in order to cause to converge, on the pressure curve of the following vessel, the real point towards the theoretical point.

In practice, points A, B, C and D are controlled (and are possibly acted upon), alone or in combination. We shall now describe how to control and act on each of these points.

Point A

Recall that the point A corresponds to the moment $t_A$ from which the pressure in the preform 3 begins to increase, after the control unit 31 has controlled the opening of the pre-blowing electrovalve 22 (at the pre-blowing cue $t_P$) in order to establish communication between the inside of the preform 3 and the source 20 of pre-blowing air.

It is important that the position of the point A be substantially identical for all of the moulding units 8. The occurrence of the point A is therefore detected, i.e. the moment $t_A$ is detected where the pressure P in the preform 3 begins to increase. (This measurement can be taken either during manufacture of the vessel 2, or a posteriori, directly on the pre-blowing curve.)

The real point A is then compared with the theoretical point A. Where the pressure at the point A is nil, in practice the moment $t_A$ of the real point A is compared with the moment of the theoretical point A, i.e. the theoretical pre-blowing beginning moment, in order to check if the moment $t_A$ of the real point A is located within the tolerances defined for the point A.

In the hypothesis where the real moment $t_A$ of the beginning of pre-blowing follows (taking the tolerance into account) the theoretical pre-blowing beginning moment, the pre-blowing cue $t_P$ is advanced.

In the hypothesis where on the contrary the real moment $t_A$ of the beginning of pre-blowing precedes (taking the tolerance into account) the theoretical moment of the beginning of the pre-blowing, the pre-blowing cue $t_P$ is delayed.

The two curves plotted in solid lines in FIG. 6 show two different settings of the pre-blowing cue $t_P$. The left curve shows an advancing of the pre-blowing cue $t_P$; the right curve shows on the contrary a delaying of the pre-blowing cue $t_P$. The theoretical curve is, between the latter, plotted in dotted lines.

More precisely, it is preferable to measure the difference separating the real moment $t_A$ of the beginning of pre-blowing of the theoretical pre-blowing beginning moment. And, if the real moment $t_A$ of the beginning of pre-blowing follows—respectively precedes—the theoretical pre-blowing beginning moment, the pre-blowing cue $t_P$ is advanced—respectively delayed—by the value of the difference.

An example with numbers is provided in the table hereinafter for the purposes of illustrating the above. The measurements shown correspond to the pressure curve in FIG. 4.

| Parameter | Value |
| --- | --- |
| Type of vessel | Bottle 1.5 l |
| Material | PET |
| Heating temperature | 120-140° C. |
| Pre-blowing pressure | 10 bars |
| Stretching speed | 2000 mm/s |
| Pre-blowing cue | 0.03 s |
| Response time of the pre-blowing electrovalve | 0.01 s |
| Theoretical pre-blowing beginning moment tolerance | ±0.005 s |
| Measurement | |
| Theoretical pre-blowing beginning moment | 0.04 s |

In order to allow for the adjustment of the point A, the machine 1 comprises:
- means for detecting the real moment $t_A$ of the beginning of pre-blowing;
- means for comparing this moment $t_A$ with the theoretical pre-blowing beginning moment; and
- means for adjusting the pre-blowing cue $t_P$ according to the result of this comparison.

The machine 1 may also comprise means for memorising a plurality of points A (for example approximately ten) detected on a series of manufactured vessels 2, in particular for the purposes of statistical study.

These means can have the form of instructions of a computer programme product implemented in the control unit 31 of the machine 1.

Point B

Recall that the point B corresponds to the plastic flow threshold of the preform 3, from which starts its radial expansion.

Adjusting the development moment $t_B$ (abscissa of the point B) makes it possible to control the radial expansion of the preform 3. A premature occurrence, or on the contrary a late one, of the development point B can in the same way indicate a poor distribution of the material, with as a consequence a defect in the strength of the vessel 2.

The occurrence of the point B is therefore detected, i.e. the moment $t_B$ when a pressure peak occurs in the preform 3 after the pre-blowing cue $t_P$ (but before the blowing cue $t_S$) is detected. As with the point A, this measurement can be taken either during manufacture of the vessel 2, or more preferably a posteriori, directly on the pre-blowing curve.

The real point B is then compared with the theoretical point B. In practice, the real development moment $t_B$ is compared with the theoretical moment of development on the one hand and, on the other hand, the real development pressure $P_B$ is compared with the theoretical development pressure in order to check that both lie within the tolerances defined for the point B.

The real point B is declared confounded with the theoretical point B when it is located within the tolerance zone defined around the theoretical point B.

When on the contrary the real point B is not confounded with the theoretical point B, i.e. it is located outside of the tolerance zone, by feedback a modification is carried out on at least one of the following parameters:
- pre-blowing cue $t_P$,
- pre-blowing pressure $P_P$,
- pre-blowing flow rate $D_P$,
- stretching speed $V_E$,
- heating temperature T of the preforms.

Several cases can occur, according to whether the real development moment $t_B$ precedes, is confounded (i.e. is within the tolerance zone) or follows the theoretical development moment, and according to whether the real development pressure $P_B$ is less than, equal (i.e. within the tolerance zone) or greater than the theoretical development pressure.

We have seen that modifying the pre-blowing cue $t_P$ produces a shift in the point A, towards the right on the axis of time when the pre-blowing cue $t_P$ is delayed, or on the contrary towards the left when the pre-blowing cue $t_P$ is advanced. In fact, this modification has an impact on the entire pre-blowing curve, which is then shifted in the same direction as the point A. The modification of the pre-blowing cue $t_P$ thus impacts the development moment $t_B$, i.e. the abscissa of the point B. In the hypothesis where the real development moment $t_B$ is, either before or after the theoretical development moment, a simple measurement could consist in delaying or, respectively, advancing the pre-blowing cue $t_P$. However, the real moment $t_A$ of the beginning of pre-blowing (abscissa of the point A) would then be affected needlessly. That is why it appears preferable that feedback on the pre-blowing cue $t_P$ in order to modify the development moment $t_B$ be carried out only when the modification of the other parameters is not enough to return the development point B to the tolerance zone.

Figure 8:
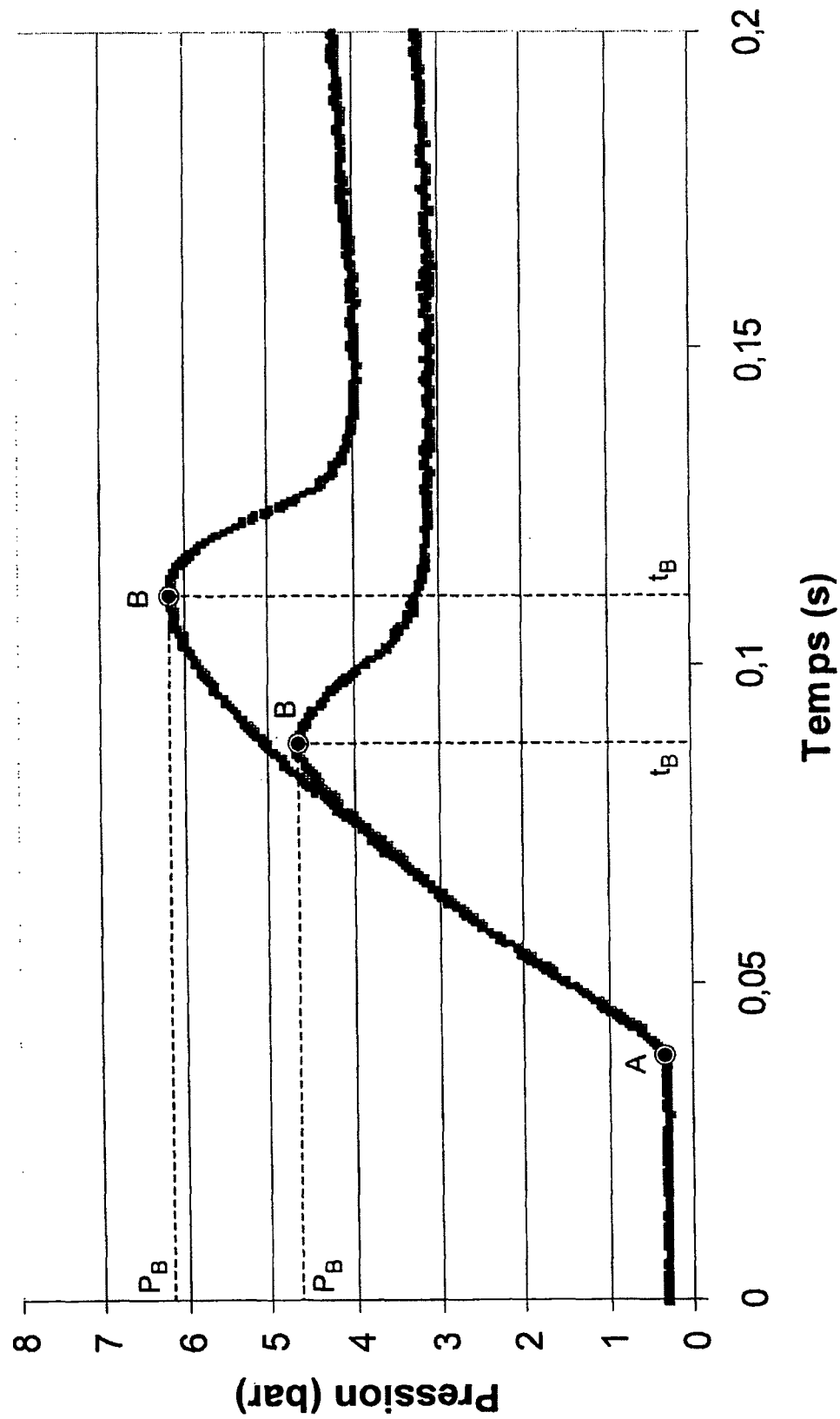
FIG. 8 is a diagram showing the superposition of two pressure curves corresponding respectively to two distinct values of the stretching speed.

The influence of the other parameters is shown in FIGS. 7, 8 and 9.

FIG. 7 shows the influence of the pressure $P_P$ or of the rate $D_P$ of pre-blowing on the unfolding of the pre-blowing. It has been observed that the influence of the pressure $P_P$ is similar to that of the rate $D_P$. The joint influence of these two parameters can therefore be expressed as the influence of their product $P_P \times D_P$: the increase in this product can result from an increase in the pre-blowing pressure $P_P$ at a constant rate $D_P$, from an increase in the pre-blowing rate $D_P$ at a constant pressure $P_P$, or from a simultaneous increase in the both $D_P$ and $P_P$; on the contrary, a decrease in the product $P_P \times D_P$ can result from a decrease in the pre-blowing pressure $P_P$ at a constant rate $D_P$, a decrease in the pre-blowing rate $D_P$ at a constant pressure $P_P$, or a simultaneous decrease in the pressure $D_P$ and in the rate $D_P$, being understood that increasing one while decreasing the other does not appear to be useful.

In FIG. 7, the left curve corresponds to a value of the product $P_P \times D_P$ greater than that corresponding to the right curve: it is observed that an increase in the product $P_P \times D_P$ results in an increase in the slope of the pressure curve at the point A (i.e. at the real moment $t_A$ of the beginning of pre-blowing), an advancing of the development moment $t_B$ and an increase in the development pressure $P_B$ (on the curve, the point B is therefore displaced towards the top and towards the left). On the contrary, a decrease in the product $P_P \times D_P$ results in a decrease in the slope of the pressure curve at the point A, a delaying of the development moment $t_B$ and a decrease in the development pressure $P_B$ (on the curve, the point B is therefore displaced towards the bottom and towards the right).

FIG. 8 shows the influence of the stretching speed $V_E$ on the unfolding of the pre-blowing. To the lower curve corresponds a stretching speed $V_E$ greater than that corresponding to the upper curve. It is observed that the increase in the stretching speed $V_E$ results in an advancing of the development moment $t_B$ and a decrease in the development pressure $P_B$ (on the curve, the point B is therefore displaced towards the bottom and towards the left), while the decrease in the stretching speed $V_E$ results in a delaying of the development moment $t_B$ and an increase in the development pressure $P_B$ (on the curve, the point B is therefore displaced towards the top and towards the right). No influence of the stretching speed $V_E$ on the slope of the pressure curve between the point A and the point B is however noted.

FIG. 9 shows the influence of the heating temperature T on the course of the pre-blowing. To the lower curve corresponds a heating temperature T greater than that corresponding to the upper curve. It is observed that the increase in the heating temperature T has an impact that is similar to the increase in the stretching speed $V_E$: advancing of the development moment $t_B$ and a decrease in the development pressure $P_B$, while the decrease in the heating temperature T has an influence similar to the decrease of the stretching speed $V_E$: delaying of the development moment $t_B$ and an increase in the development pressure $P_B$.

We shall present hereinafter the recommended measures to return, in each possible case, the development point B to its tolerance zone, according to the observed influence of the parameters listed hereinabove and of the priority given to certain parameters over others. In practice, priority is given to the pressure $P_P$ or to the rate $D_P$ over the heating temperature T. In light of its influence on the entire curve, and in particular on the real point A of the beginning of pre-blowing, the pre-blowing cue $t_P$ is, in practice, modified only when modifications of the pressure $P_P$, in the rate $D_P$ or in the heating temperature T have not been enough to return the development point B to its tolerance zone. As for the stretching speed $V_E$, this is modified only in order to refine the positioning of the development point B (and with the condition that the machine 1 be provided with means of adjusting the stretching speed $V_E$).

| Development moment | Development pressure | Modification of the parameters |
|---|---|---|
| Before | Lower | Decrease T |
|  | In the tolerance zone | Decrease $D_P$ or $P_P$ Decrease T |
|  | Higher | Decrease $D_P$ or $P_P$ |
| In the tolerance zone | Lower | Decrease T Increase $D_P$ or $P_P$ |
|  | In the tolerance zone |  |
|  | Higher | Increase T Decrease $D_P$ or $P_P$ |
| After | Lower | Increase $D_P$ or $P_P$ |
|  | In the tolerance zone | Increase $D_P$ or $P_P$ Increase T |
|  | Higher | Increase T Where applicable: Decrease $D_P$ or $P_P$, Advance pre-blowing cue |

An example with numbers is provided in the table hereinafter, in order to show the values of the moment and of the development pressure. The measurements shown correspond to the pressure curve in FIG. 4.

| Parameter | Value |
|---|---|
| Type of vessel | Bottle 1.5 l |
| Material | PET |
| Heating temperature | 120-140° C. |
| Pre-blowing pressure | 10 bars |
| Pre-blowing flow rate* | 40 l/s |
| Stretching speed | 2000 mm/s |
| Pre-blowing cue | 0.03 s |
| Development moment tolerance | ±0.005 s |
| Development pressure tolerance | 0.5 bar |
| Measurement |  |
| Development moment (point B) | 0.07 s |
| Development pressure (point B) | 5 bars |

*given in normolitres per second (equivalent of the litre per second at atmospheric pressure)
Note that the displacement of the development point B (especially its abscissa, the development moment $t_B$) has an incidence on the moment $t_C$ of expansion end (abscissa of the point C). The modifications of parameters that affect the position of the point B can thus result in having to modify the position of the point D (i.e., according to the case, in advancing or in delaying the blowing cue $t_S$) which can indeed be located shifted in relation to point C; the corresponding adjustments are presented hereinafter.

In order to allow for the adjustment of the point B, the machine 1 comprises:
 means for detecting the development moment $t_B$;
 means for comparing the development moment $t_B$ and the development pressure $P_B$ with, respectively, the theoretical development moment and pressure;
 means for adjusting the pre-blowing rate $D_P$ according to this comparison.

These means can take the form of instructions of a computer programme product implemented in the control unit 31 of the machine 1.

Figure 2:
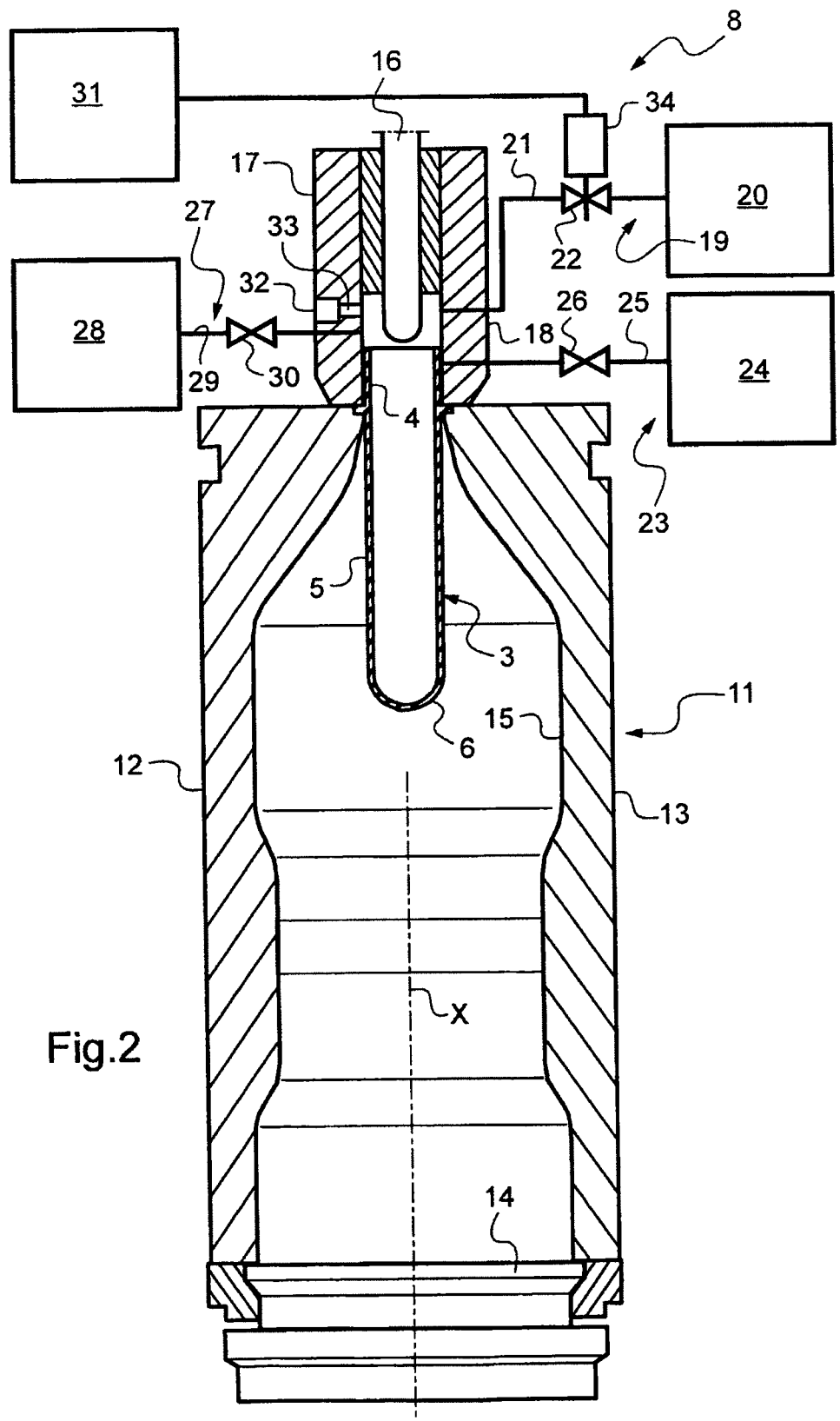
FIG. 2 is a schematic cross-section view showing partially a moulding unit in the machine in FIG. 1.

Furthermore, in order to effectively proceed in adjusting of the pre-blowing rate $D_P$, the machine 1 comprises for example a flow regulator 34 mounted on the pre-blowing electrovalve and controlled by the control unit 31 (cf. FIG. 2).

The machine 1 can, according to the parameters that are chosen to adjust, include, for example in the form of additional instructions from the computer programme:
 means for adjusting the pre-blowing pressure $P_P$ according to the comparison between the real point B and the theoretical point B;
 means for adjusting the heating temperature T according to the comparison between the real point B and the theoretical point B;
 means for adjusting the pre-blowing cue $t_P$ according to the comparison between the real point B and the theoretical point B;
 means for adjusting the stretching speed $V_E$ according to the comparison between the real point B and the theoretical point B.

Alternatively, it can be desired to adjust the development moment $t_B$ independently of the development pressure $P_B$, or reciprocally adjust the development pressure $P_B$ independently of the development moment $t_B$.

In the first case, the pressure peak is detected and action is taken on at least one of the following parameters: pre-blowing pressure $P_P$, pre-blowing flow rate $D_P$, pre-blowing cue $t_P$, stretching speed $V_E$, heating temperature T in order to advance or, on the contrary, delay the development moment $t_B$.

In the second case, the pressure peak is detected and action is taken on at least one of the following parameters: pre-blowing pressure $P_P$, pre-blowing flow rate $D_P$, pre-blowing cue $t_P$, stretching speed $V_E$, heating temperature T in order to increase or, on the contrary, decrease the development pressure $P_B$.

The machine 1 may also comprise means for memorising a plurality of points B (for example approximately ten) detected on a series of manufactured vessels 2, in particular for the purposes of statistical study.

Points C, D

Recall that the point C corresponds to the end of the expansion of the preform 3, when the latter has reached the surface of the cavity 15 over substantially all of its height, i.e. when the internal volume of the preform 3 has almost reached the final volume of the vessel 2. At the point C, the pressure curve sags and has an increase in its slope.

Once the expansion of the preform 3 is terminated, it is useless to continue to inject pre-blowing air therein, of which the pressure $P_P$ is not enough to allow the material (which continues to cool and is therefore less and less deformable) to perfectly hug the surface of the cavity 15: such an operation therefore constitutes a loss of time that puts a strain on the productivity with no incidence on the quality of the vessel 2. It therefore appears desirable to start the blowing as soon as the expansion of the preform 3 has completed. In other words, it is desirable to take measurements in order to converge, on the pressure curve, the point D (beginning of the blowing) towards the point C (expansion end of the preform 3).

The occurrence of the point C is therefore detected, i.e. the moment $t_C$ from which the pressure in the preform 3 begins to increase in a linear manner (moment of expansion end). Then, in the hypothesis where the blowing cue $t_P$ follows the moment of expansion end, the blowing cue is advanced in order to converge the point D towards the point C.

More precisely, the delay separating the moment $t_C$ of expansion end from the blowing cue $t_S$ is measured, and the blowing cue $t_S$ is advanced by a value equal to this delay. In reality, the response time of the blowing electrovalve 26 must be taken into account, due to which the real moment $t_D$ of the beginning of blowing (abscissa of the point D) is slightly after the blowing cue $t_S$.

In other words, either the delay separating the moment $t_C$ of expansion end from the moment $t_D$ of the beginning of blowing is measured and the blowing cue $t_S$ is advanced by a value equal to this delay, or the delay separating the moment $t_C$ of expansion end from the blowing cue $t_S$ is measured and the blowing cue $t_S$ is advanced by a value equal to this delay, increased by the response time of the blowing electrovalve 26.

As with points A and B, a certain tolerance is accepted for the point C. In other words, the points C and D are assumed to be confounded when the delay separating the moment $t_C$ of expansion end from the moment $t_D$ of the beginning of blowing (or the delay separating the moment $t_C$ of expansion end from the blowing cue $t_S$ increased by the response time of the blowing electrovalve 26) is less than a predetermined value.

In FIG. 10, two curves are shown: the one on the right corresponds to the presence of a difference between the moment $t_C$ of the expansion end and the moment $t_D$ of the beginning of blowing. The left curve, in dotted lines, corresponds to an adjustment carried out through feedback on the base of the right curve: the blowing cue $t_S$ has been advanced by the value of the difference separating on the right curve the moment $t_C$ from the moment $t_D$.

An example with numbers is provided in the table hereinafter for the purposes of illustrating the above. The measurements shown correspond to the pressure curve in FIG. 4.

| Parameter | Value |
| --- | --- |
| Type of vessel | Bottle 1.5 l |
| Material | PET |
| Heating temperature | 120-140° C. |
| Pre-blowing pressure | 10 bars |
| Stretching speed | 2000 mm/s |
| Pre-blowing cue | 0.03 s |
| Response time of the pre-blowing electrovalve | 0.01 s |
| Response time of the blowing electrovalve | 0.01 s |
| Point C tolerance | ±0.005 s |
| Measurement | |
| Moment of the beginning of pre-blowing (point A) | 0.04 s |
| Development moment (point B) | 0.07 s |
| Moment of stretching end | 0.15 s |
| Moment of expansion end (point C) | 0.18 s |

In order to allow for the adjustment of the point D, the machine 1 comprises:
 means for detecting the moment $t_C$ of the expansion end; and
 means for adjusting the blowing cue $t_S$ according to the moment $t_C$ of the expansion end.
More precisely, the machine 1 can include:
 means for detecting the moment $t_D$ of the beginning of blowing; and
 means for comparing the moment $t_C$ of the expansion end with the moment $t_D$ of the beginning of blowing, the means for adjusting being provided in order to advance the blowing cue $t_S$ by the value of the difference between them.

The machine 1 may also comprise means for memorising a plurality of points C and/or D (for example approximately ten) detected on a series of manufactured vessels 2, in particular for the purposes of statistical study.

Alternatively (or as a complement), the machine 1 can include means for comparing the moment $t_C$ of the expansion end with the pre-blowing cue $t_S$, the means for adjusting being provided in order to advance the blowing cue $t_S$ by the value of the difference between them, increased by the response time of the blowing electrovalve 26.

These means can have the form of instructions of a computer programme product implemented in the control unit 31.

The invention claimed is:

1. A method for producing a vessel (2) by blowing in a mould (11) from a preform (3) made of plastic material, wherein the method comprises:
 introducing the preform (3) into the mould;
 at a predetermined moment, called pre-blowing cue (tp), controlling the opening of an electrovalve (22) for establishing a communication between an inside of the preform (3) with a source (20) of gas at a predetermined pre-blowing pressure;
 measuring a pressure (P) inside the preform (3);
 detecting a real moment (tA) at the beginning of the pre-blowing, at which the pressure (P) in the preform (3) starts to increase;
 comparing the real moment (tA) with a theoretical pre-blowing beginning moment from a theoretical reference curve;
 if the real moment (tA) at the beginning of the pre-blowing follows the theoretical pre-blowing beginning moment, advance the pre-blowing cue (tp); and
 if the real moment (tA) at the beginning of the pre-blowing precedes the theoretical pre-blowing beginning moment, delay the pre-blowing cue (tp).

2. The method according to claim 1, further comprising:
 measuring a difference between the real moment (tA) and the theoretical pre-blowing beginning moment;
 if the real moment (tA) at the beginning of the pre-blowing follows the theoretical pre-blowing beginning moment, advance the pre-blowing cue (tp) by a value equal to the difference;
 if the real moment (tA) at the beginning of the pre-blowing precedes the theoretical pre-blowing beginning moment, delay the pre-blowing cue (tp) by a value equal to the difference.

3. The method according to claim 1, further comprising:
 measuring a difference between the real moment (tA) at the beginning of the pre-blowing and the pre-blowing cue (tp);
 if the real moment (tA) at the beginning of the pre-blowing follows the pre-blowing cue (tp) increased by a predetermined response time of the electrovalve (22), advance the pre-blowing cue (tp) by a value equal to the difference between the real moment (tA) at the beginning of the pre-blowing and the pre-blowing cue (tp), increased by the predetermined response time of the electrovalve (22);
 if the real moment (tA) at the beginning of the pre-blowing precedes the pre-blowing cue (tp) reduced by a predetermined response time of the electrovalve (22), delay the pre-blowing cue (tp) by a value equal to the difference between the real moment (tA) of the beginning of the pre- blowing and the pre-blowing cue (tp), reduced by the predetermined response time of the electrovalve (22).

4. The method according to claim 1, wherein the method is performed by a control unit that includes executable program instructions.

* * * * *